July 8, 1969 J. W. RYAN ET AL 3,454,344
GAMES EMPLOYING pH-SENSITIVE MEDIA
Filed Dec. 15, 1965 Sheet 1 of 2
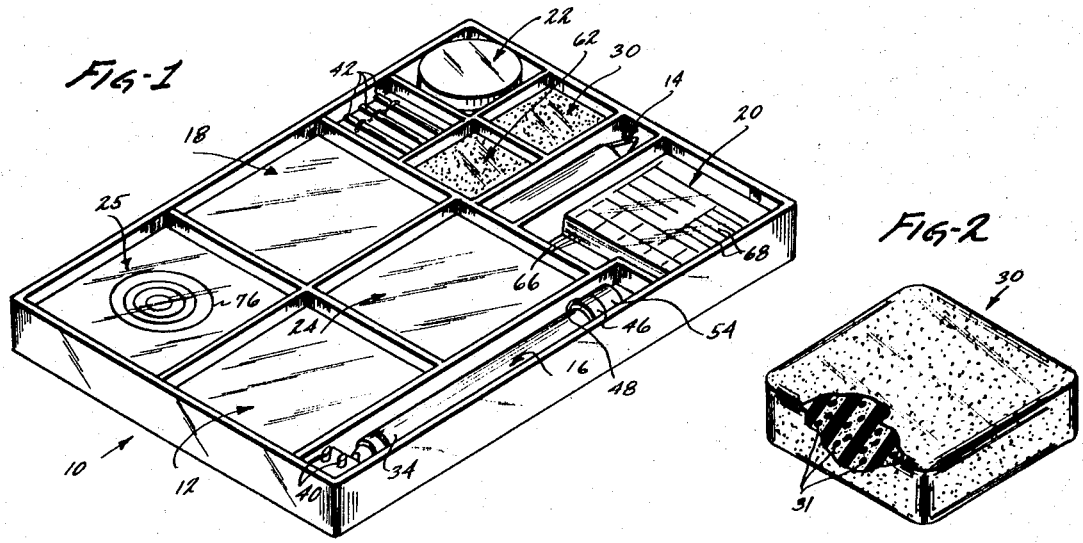
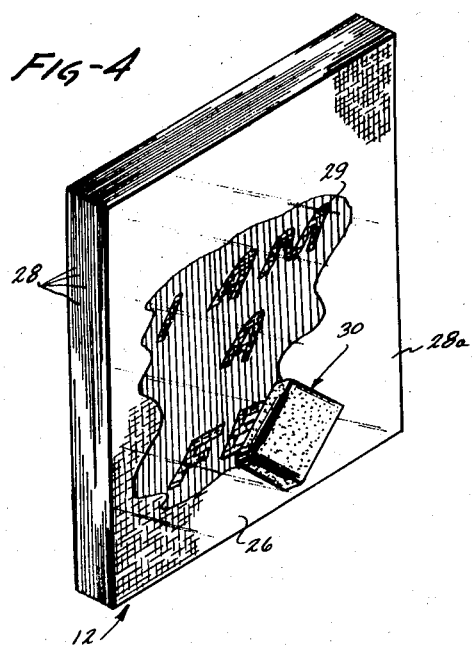
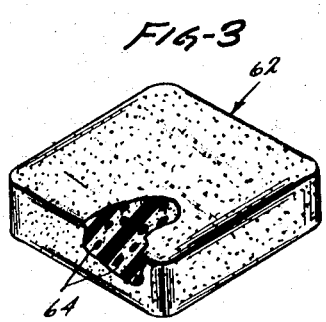
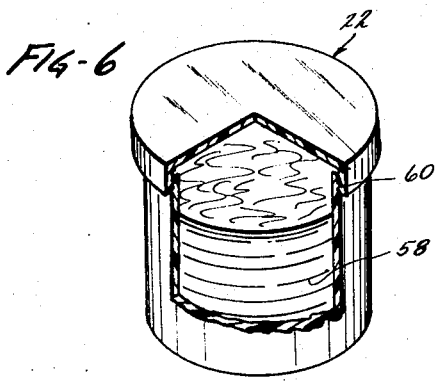
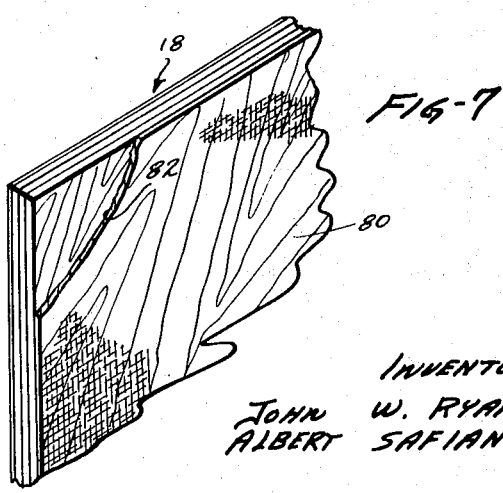
INVENTORS
JOHN W. RYAN
ALBERT SAFIANOFF
BY Hezzy, Walsh + Clarkham
ATTORNEYS

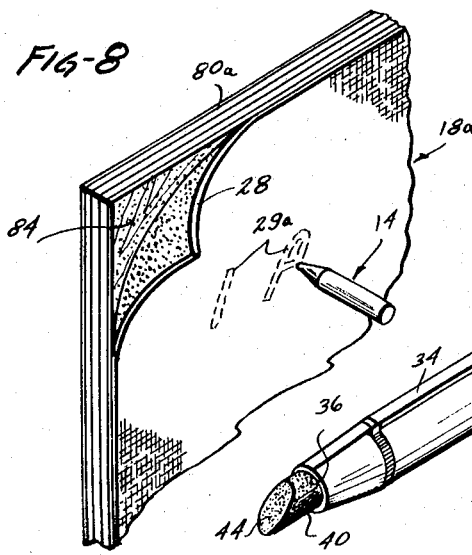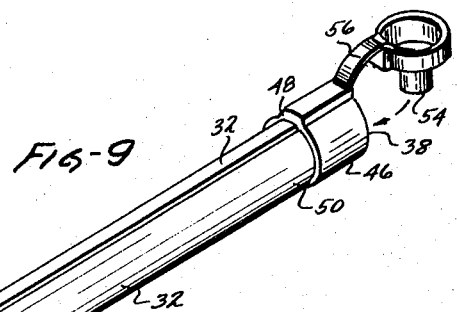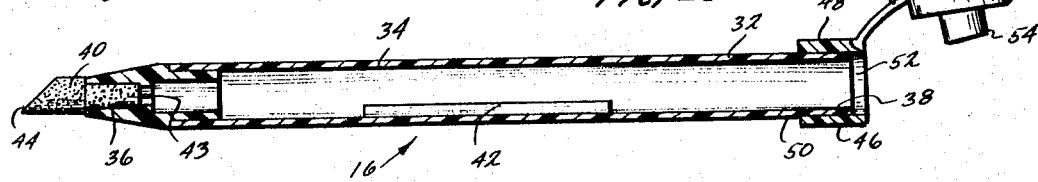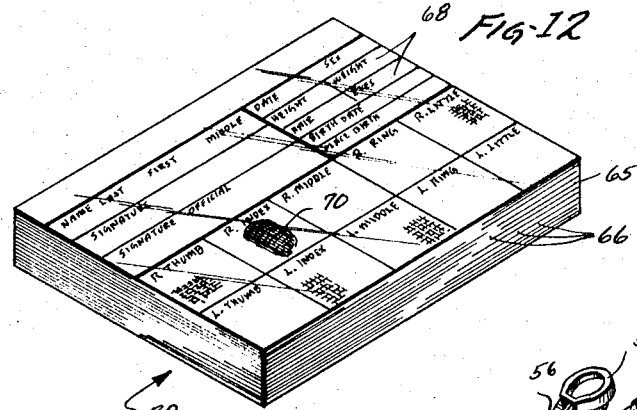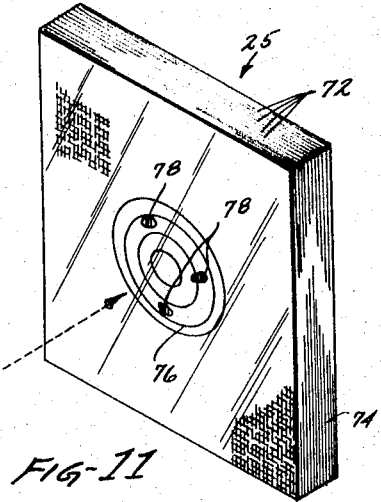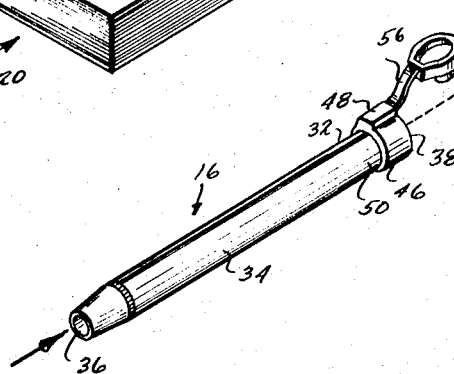

United States Patent Office 3,454,344
Patented July 8, 1969

3,454,344
GAMES EMPLOYING pH-SENSITIVE MEDIA
John W. Ryan, Bel Air, and Albert Safianoff, Palo Verde,
Calif., assignors to Matttel, Inc., Hawthorne, Calif.,
a corporation of California
Filed Dec. 15, 1965, Ser. No. 514,047
Int. Cl. B43k 29/12, 29/20; B43l 1/00
U.S. Cl. 401—195                      3 Claims

ABSTRACT OF THE DISCLOSURE

A game having a sheet or board having a surface of one color provided by a pH-sensitive indicator dye. A movable marking implement is used to delineate information on the surface and by then treating the surface with a solution of suitable pH the delineated information is caused to appear in a color contrasted with said one color.

---

The present invention relates generally to games employing pH-sensitive media and more particularly to such games which, in some embodiments, include apparatus for producing and deciphering "hidden" writings by the use of two or more different media having similar colors when the message is "hidden" with one of the media changing color to reveal the message when subjected to a method of treatment of the present invention and which, in other embodiments, include apparatus for producing writings, drawings and the like in contrasting colors without using innocuous coloring materials.

Children, and at least some adults, enjoy the creation of secrets and magic such as secret passwords, codes, and disappearing objects. They particularly enjoy the mystification or amazement of their playmates, and their own feeling of superiority, if they can create and control something which their playmates can not understand or use.

The employment of secret codes, hidden writings, and simulations of the efforts of spys and counterspys are attractive to children. The object of such endeavors generally is to produce something which appears innocuous or unintelligible, but which contains some hidden meaning which the initiate can discover. In the prior art, verbal messages may be written in invisible ink which, upon heating or other treatment, is made visible on a writing surface which previously was blank or bore a different message. Also, complicated line drawings of an innocuous scene have been devised which, when patiently examined from different angles, contain one or more smaller drawings of different or unrelated figures or scenes.

Games are also known in which the player is required to view the game apparatus through colored transparencies, some objects or symbols in the game are of a corresponding color; hence the players can not see them so long as they view the game only through the colored transparencies, and some surprise or training value is achieved by their efforts to play the game while viewing it through the transparencies.

Utilization of many of the prior games and devices, and the entertainment value associated with their employment, have tended to suffer either because the discovery of the hidden material was equally easy for all people who knew of the game or device or because they required relatively elaborate equipment or procedures which were particularly less appropriate for younger children.

In addition, children are fond of playing with coloring materials such as crayons, dyes, and paints. However, adult supervisors of children playing with such materials find them to be somewhat innocuous because the children have difficulty keeping the coloring materials off clothing, furniture and walls.

It is the primary object of the present invention, in view of the foregoing, to provide simple, reliable and inexpensive games employing pH-sensitive media.

It is another object of the invention to provide means for encoding and decoding messages, including both verbal messages and graphic messages such as pictures, maps and the like.

Yet another object of the present invention is to provide a game, particularly for children, enabling the players to prepare colored graphic messages such as pictures, maps and the like using uncolored innocuous materials.

Still another object of the present invention is to provide game apparatus for producing coded messages which can be decoded immediately using nothing but water to wet an absorbent sponge, blotter or the like of the present invention which stores chemicals in accordance with the method of the present invention.

A further object of the present invention is to provide a complete coding game using nothing but paper.

A still further object of the present invention is to provide an innocuous finger painting set which will not discolor a child's fingers in use.

Another object of the present invention is to provide a new and useful dart game employing pH sensitive targets.

Another object of the present invention is to provide a finger print kit employing pH sensitive paper.

According to a first embodiment of the present invention, a game apparatus is provided which includes a first writing medium having a predetermined color and a second writing medium which is substantially the same color as the first writing medium. One medium may be used to write messages on the other medium. The messages will not be readily visible to the naked eye because of the absence of a contrasting color. One medium is given its color by employing a pH-sensitive indicator dye to produce the predetermined color.

The game apparatus also includes a solute-containing absorbent material, such as a sponge, a blotter or the like, which stores innocuous chemicals, such as sodium-carbonate, baking soda, vinegar, citric acid or the like, capable of shifting the pH range of the medium which has been dyed with the pH-sensitive dye. The solute may be placed into solution by wetting the sponge with a suitable solvent, such as water. The pH-sensitive writing medium may then be treated with this solution by rubbing the absorbent material thereover. The solution causes the pH-sensitive dye to change to a contrasting color while the other writing medium retains its original color. The messages will then be readily visible because of the contrasting color.

The pH sensitive medium may be prepared by dyeing writing paper with a pH sensitive dye such as direct yellow 4 or other suitable dyes to be hereinafter mentioned. The paper is given a vivid yellow color by setting the pH sensitive dye on the acid side of its shift range. Messages may then be written on the paper with a wax writing instrument which is either transparent or which has a vivid yellow color corresponding substantially to the color of the paper so that the writing is not readily visible to the unaided eye.

A solute-containing sponge storing sodium-carbonate or other basic medium may then be dipped in water and wiped across the paper. This turns the paper to a vivid red in all areas except the areas containing the wax from the crayon, which remains yellow. Thus, the message is made to appear by giving the background upon which the message is written a contrasting color.

In a second embodiment of the present invention, a writing instrument is provided in the form of a wick-type pen having a felt writing tip communicating with a hollow casing in which a solute-containing absorbent material, such as a sodium-carbonate impregnated strip of blotting paper, may be placed after which the casing may be filled with water. The felt tip then becomes an innocuous writing instrument which will not stain ordinary objects upon which it is used. However, when applied to paper which has been dyed with a pH sensitive indicator dye set on the acid side of its shift range, a writing in contrasting color appears because the sodium carbonate solution shifts the pH sensitive dye to the basic side of its shift range.

Alternatively, messages may be written using an innocuous writing medium constituting a third embodiment of the present invention which comprises a transparent thickening agent to which sodium carbonate has been added. When the transparent thickening agent is rubbed across the pH sensitive paper, a portion of the paper contacted by the thickening agent changes to a color. Either the wick-type pen or the thickening agent may be employed to treat the paper used in the first embodiment of the invention which has previously received a message written with the yellow wax writing instrument so that all portions of the paper contacted by the thickening agent or the wick-type pen, except the portion of the paper underlying the wax writing, will turn to a vivid red.

Another writing medium of the present invention comprises a simulated blackboard which may be made by treating a sheet of wood with a pH sensitive indicator dye, such as direct yellow 4, and setting the dye on the acid side of its shift range. The wick-type pen of the present invention may then be used to write upon the board with what appears to be clear water making a message mysteriously appear by shifting the direct yellow 4 to the basic side of its shift range where it is a vivid red. Alternatively, the simulated blackboard may be made by laminating the wood. Also, paper or wood may be dyed with a pH sensitive dye set on the basic side of its shift range and a writing instrument which dipenses an innocuous acid may be used to write messages upon the paper or wood.

Any of the writing media of the present invention which have been treated with the sodium carbonate to change color to a vivid red may be reversed to a vivid yellow again by treating the writing medium with a water-dipped sponge of the present invention which was previously impregnated with an acid solution, such as vinegar or citric acid, and then permitted to dry.

Alternatively, the pen may be filled with a direct yellow 4 indicator dye which has been set on its acid side so that it is a vivid yellow color. The pen may then be used to write upon a sheet of paper which has been dyed a similar yellow color with a dye which is not pH sensitive. The paper may then be treated with a sodium carbonate solution by dipping a sponge of the present invention in ordinary water and rubbing it across the writing. Since the paper is not pH sensitive, but the message is written in a pH sensitive ink, the message will appear in a vivid red upon the yellow background. The message can be made to disappear again by treating the paper with the sponge which stores the acid to reverse the vivid red back to a vivid yellow on the acid side of its shift range.

In another embodiment of the present invention, targets are printed on pH sensitive paper and the wick-type pen is employed as a dart gun to shoot the felt writing tip at the target after the tips have first been wetted with a chemical which will shift the pH sensitive dye in the paper target to the other side of its shift range.

In yet another embodiment of the present invention, fingerprint information is printed on a paper previously dyed with a pH sensitive dye which is set on one side of its shift range. Fingerprints may be taken by first dipping the fingers of the subject in a chemical solution which will shift the pH sensitive dye to the other side of its shift range, and then pressing the dipped fingers onto the pH sensitive paper.

Coloring dyes per se have been classified or categorized in many ways. The chemist, from his vantage point, has often classified the myriad of available dyes from the standpoint of chemical or molecular similarity. The artisan on the other hand, being concerned with the application of color to various products, has tended to classify dyes with respect to the properties that determine their use. In this area, the classifications have included acid dyes, azoic compositions, basic dyes, dispersed dyes, fiber-reactive dyes, and mordant dyes, to name only a few of the general classifications which will be familiar to those skilled in this art.

Another and practical classification of dye type materials has been developed, namely, materials known as "indicators," and specifically "indicator dyes." The broad grouping of materials that have been discovered and are currently being discovered which will function as indicators escape conventional chemical classification. They are commonly categorized by their functional ability to visually show, by a capacity for color change, the condition of a solution or product with respect to its relative acidity. An example of a classical use of an indicator is detecting the end point of a titration.

The present invention specifically comprehends the use of those products which historically have been classified as indicator dyes. More specifically, the present invention is concerned with specific indicator dyes that effectuate a color change in response to a variation in hydrogen-ion concentration which may be defined as pH variation or pH sensitivity. Secondarily, the present invention comprehends pH responsive indicator dyes which have the capacity to initially color or tinge a fiber, and thereafter, in response to pH change, induce a visible color variation of the fiber.

pH has been defined as the negative logarithm of the effective hydrogen-ion concentration or hydrogen-ion activity in gram equivalents per liter of fluid. It is characteristically used for expressing both acidity and alkalinity in a relative manner on an empirical scale of zero to 14, in which 7 represents neutrality; the pH value of pure water at 25 degrees centigrade. Values less than 7 represent increasing hydrogen-ion concentration and increasing acidity or the acid range. Values greater than 7 represent decreasing hydrogen-ion concentration and increasing alkalinity or the basic range. The indicator dyes here under consideration all exhibit a definite characteristic relative to the pH scale, namely, to exhibit a first color at one level of hydrogen-ion concentration and to sharply change color at another level of hydrogen-ion concentration. The scale range through which the color change takes place is usually referred to as the "shift range" or "shift point."

Considering a specific application of the disclosed invention, namely, as a toy, certain parameters are dictated by this ultimate use which have an effect of setting practical limits on the practice of the invention. With this thought in mind, it will be apparent that the mode of practice of the invention must meet a major requirement of safety. Clearly, the dyes utilized must have relatively non-toxic characteristics. To provide the child with game apparatus having an extended play life, the dyed product must exhibit sufficient stability in the presence of water, light, ultra-violet rays and infrared rays all of which are found in the play environment.

The features of the present invention, which are believed to be novel are set forth with particularity in the appended claims. The present invention, both as to its organization and manner of operation, together with further objects and advantages thereof, may best be understood by reference to the following description, taken in connection with the accompanying drawings, in which like reference characters refer to like elements in the several views.

In the drawings:

FIGURE 1 is a perspective view of a kit containing the several embodiments of the present invention;

FIGURE 2 is an enlarged perspective view of a first sponge of the present invention which is included in the kit shown in FIGURE 1 and which has been impregnated with a sodium carbonate solution and allowed to dry;

FIGURE 3 is an enlarged perspective view of a second sponge from the kit of FIGURE 1 which has been impregnated with an acid solution and allowed to dry;

FIGURE 4 is an enlarged perspective view of a message pad from the kit of FIGURE 1 comprising a first writing medium made from a pH sensitive paper;

FIGURE 5 is an enlarged perspective view of a second writing medium from the kit of FIGURE 1 which may be used to write invisible messages on the pad shown in FIGURE 4;

FIGURE 6 is an enlarged perspective view of a jar of jelly from the kit of FIGURE 1 which may be used to place verbal or graphic messages on the message pad shown in FIGURE 4;

FIGURE 7 is an enlarged perspective view of a first simulated "blackboard" from the kit of FIGURE 1;

FIGURE 8 is an enlarged perspective view of a second simulated "blackboard" from the kit of FIGURE 1;

FIGURE 9 is an enlarged perspective view of a wick-type pen from the kit of FIGURE 1;

FIGURE 10 is a cross-sectional view of the pen of FIGURE 9;

FIGURE 11 is an enlarged perspective view of a dart game from the kit of FIGURE 1; and FIGURE 12 is an enlarged perspective view of a fingerprint pad from the kit of FIGURE 1.

Referring again to the drawings and particularly to FIGURE 1, a kit containing the games comprising the several embodiments of the present invention, generally designated 10, includes a plurality of writing media 12, 14, 16, 18, 20, 22, 24 and 25.

Referring now to FIGURES 2, 4 and 5, the writing medium 12 may comprise a message pad 26 having individual sheets of paper 28 which are preferably of the wet-strength type. The sheets 28 may be dyed a predetermined color by employing a suitable pH sensitive dye, which has a first color on one side of its shift range and a second color on the other side thereof. For example, the sheets 28 may be dyed with a pH sensitive indicator dye known commercially as "direct yellow 4" which is yellow on the acid side of the shift range and vivid red on the basic side thereof. After they have been dyed, the sheets 28 are set on the acid side of the shift range so that they have a vivid yellow color.

Secret messages may be written on the sheets 28 in such a manner that the message will not be readily visible, but will become visible when the sheets 28 are treated in a manner to be hereinafter described.

The writing medium 14 comprises a wax crayon which may be transparent or which may have a vivid yellow color approximating the color of the sheets 28. The crayon 14 may be used to place a message 29 on a particular sheet 28a. Since the crayon 14 and the sheet 28a are approximately the same color, the message 29 will not be readily apparent to a person looking at the sheet 28a with the unaided eye.

However, when the sheet 28a is treated with a basic solution, all portions thereof, except the portions underlying the message written with the wax crayon, will turn a vivid red in color. This basic solution may be applied to the sheet 28a by dipping a sodium-carbonate impregnated sponge 30 in water and then rubbing the wet sponge across the sheet 28a shifting the direct yellow 4 indicator dye to the basic side of its shift point where it is a vivid red color. The sponge 30 may be impregnated with the sodium carbonate, or other suitable basic substance, by soaking it in a concentrated solution thereof and then permitting the sponge to dry evaporating the water and leaving a sodium carbonate deposit as a solute, as indicated diagrammatically at 31 in FIGURE 2. This solute may then be placed in solution by dipping the sponge 30 in a suitable solvent, such as water, of course it is apparent that the sponge 30 may be dispensed with by dipping the sheet 28a in a solution of sodium carbonate.

Alternatively, the writing medium 16 may be employed for applying a basic solution to the sheet 28a containing the message 29. The writing medium 16 (FIGURES 9 and 10) includes a container 32 having an encompassing side wall 34, an open bottom 36 and an open top 38. A felt writing tip 40 may be taken from the kit 10 (FIGURE 1) and placed in the open bottom 36. A strip of blotting paper 42 containing a sodium-carbonate solute is also taken from the kit 10 and placed in the container 32 which may then be filled with a suitable solvent, such as ordinary tap water, to leach the sodium-carbonate solute from the blotting paper 42 forming a basic solution which will flow by capillary action from the upper end 43 to the writing end 44 of the felt tip 40. The open top 38 may be closed by a closure member 46 having a base portion 48 which encompasses the end 50 of the writing medium 16 and which includes an open top 52 which, in turn, may be closed by a cap member 54 swingably connected to the base portion 48 by a strap 56.

The writing medium 16 may also be employed to write messages directly on the pad 26. These messages will appear thereon in a vivid red against a yellow background because the sodium-carbonate writing solution contained in the writing medium 16 shifts the direct yellow 4 indicator dye to the basic side of its shift point.

Yet another method which may be employed to make the message 29 appear on the sheet 28a is to employ the writing medium 22 (FIGURES 1 and 6) comprising a jell 58 which may be conveniently supplied in a container 60. The jell 58 may conveniently comprise a transparent thickening agent commonly used for paints in which a solute is dispersed. The solute in the jell 58 has a pH at or beyond one side of the shift range of the sheet 28a. Examples of such a solute are sodium-carbonate and sodium bicarbonate, to name only a couple. The thickener may comprise an aqueous solution of sodium polyacrylate or other polymeric acrylic salts. The jell 58 may be applied to the sheet 28a by a child user by merely dipping his fingers into the jell 58 and smearing it over the message 29 changing the color of the sheet 28a surrounding the message 29 to a vivid red color while the message 29 retains the yellow color of the crayon 14.

It is an important feature of the present invention that the jell 58 may also be employed to either place messages directly on the sheet 28a without first using the crayon 14 or to paint on the sheet 28a by fingerpainting techniques by merely writing or drawing on the sheet 28a.

This method of fingerpainting is innocuous because the transparent jell 58 will not impart color to the child user's fingers even though the paper 28a changes from a vivid yellow to a vivid red color in all areas underlying the jell 58. If desired, the sheet 28a may be set on the basic side of its shift range and the solute in the jell 58 may comprise vinegar, citric acid, ascorbic acid or other suitable acidic substance.

The kit 10 also includes a second sponge 62 (FIGURES 1 and 3) which may be impregnated with a suitable acidic substance, such as vinegar, ascorbic acid or citric acid having a pH at or beyond the acid side of the shift range of the sheet 28a. The sponge 62 is then allowed to dry leaving a solute 64 which may be put into solution by dipping the sponge 62 in a suitable solvent, such as water. The sponge 62 may then be rubbed over the sheet 28a driving the pH-sensitive dye therein to its acid side where it again becomes a vivid yellow color.

Since the sheet 28a has wet strength, it may be used over again for other messages and drawings, if desired. Alternatively, the sheet 28a may be set on the basic side of its shift range and then written upon with a red or transparent crayon. The writing will then appear clearly to the unaided eye when the sheet 28a is treated with the sponge 62 or any other writing medium containing a solution having a pH at or beyond the acid side of the shift range of the sheet 28a.

The writing medium 24 may comprise a pad similar to the pad 26 except that a regular yellow dye is employed in making the writing medium 24 a vivid yellow color which is not pH-sensitive. The writing medium 24 may then be written upon with the writing medium 16 which, in this case, will be filled with a pH-sensitive dye in the form of direct yellow 4 on its acid side so that the writing on the yellow paper will be substantially the same color as the paper so that it is not readily discernible to the unaided eye. A message is then made to appear on the writing medium 24 as if by magic by merely dipping the sponge 30 in water and wiping it over the paper so that the yellow writing from the writing medium 16 would turn a vivid red in color. This writing could be made to disappear by rubbing the sponge 62 over the writing medium 24 returning the writing to its acid side having the yellow color.

Referring now to FIGURES 1 and 12, the writing medium 20 may comprise a pad 65 of wet-strength paper which has been dyed with direct yellow 4 set on its acid side giving the paper a vivid yellow color. One side of the individual sheets 66 of the pad 65 may be provided with the printed material found on a conventional fingerprint card, as shown at 68, so that the writing medium 20 may be used for taking a person's fingerprints by merely wetting his fingers on the sponge 30 and putting them on a sheet 66 or by dipping them in the jell 58 and pressing them on the sheet 66 leaving fingerprints, as indicated at 70 for the right index finger.

Referring more in particular to FIGURES 1 and 11, the individual sheets 72 in a pad 74 forming the writing medium 25 may be provided with a printed, circular pattern in a contrasting color to provide a target 76 in the form of a well known "bull's eye" or the like. The sheets 72 may be dyed with direct yellow 4 set on its acid side giving the sheets 72 a vivid yellow color. The writing medium 16 may then be employed as a dart gun by removing the felt tip 40 from the open bottom 36 and dipping it in a basic solution formed by placing a strip 42 in a pan of water and soaking the tip 40 therein. The soaked tip 40 may then be placed in the open top 38 of the writing medium 16 and blown at the target 76. Should the saturated felt tip 40 strike the target 76, the basic solution contained in the tip 40 will cause the pH indicator dye to be driven to the basic side of its shift point turning to a vivid red color to clearly indicate the spot 78 at which the target was struck.

The writing medium 18 (FIGURES 1 and 7) comprises a simulated blackboard having a plywood portion 80 including a surface ply 82 which may be dyed with a pH sensitive dye, such as direct yellow 4 or the like, which is set on the acid side. The surface ply 82 is preferably water permeable, but not water soluble and should have sufficient porosity to absorb the dye while having a grain structure which does not substantially feather the dye. The writing medium 16 may then be provided with a felt tip 40 and filled with water after placing a strip 42 in the container portion 32 to form a basic solution. The basic solution will shift the indicator dye to the other side of its shift point where it turns to a contrasting color, such as vivid red when direct yellow 4 is used as the dye. The writing may be removed from the surface 82 by treating it with the sponge 62 driving the writing back to the acid side.

A modified form of a simulated blackboard is shown in FIGURE 8 at 18a and includes a wooden base member 80a to which one of the sheets 28 from the pad 26 may be secured by a suitable adhesive 84. The writing medium 14 may then be used to write an "invisible" message 29a on the simulated blackboard 18a in the manner previously described in connection with FIGURES 2, 4 and 5.

Illustrative examples of the method of the present invention are as follows:

EXAMPLE 1

A wax crayon having a predetermined color was used to write a message on a pH-sensitive sheet of paper having a color substantially matching said predetermined color on the acid side of its shift point.

A sponge containing sodium carbonate was then moistened with water and wiped over the message to drive the portion of the paper surrounding the message to the basic side of its shift point so that the paper changed color leaving the wax message clearly visible because of its contrasting color.

The message was then made to disappear by rubbing the paper with an acid impregnated sponge to change the paper back to its original color by driving it back to the acid side of its shift point.

EXAMPLE 2

A sheet of paper having a predetermined color was written upon with a pH-sensitive dye having a first predetermined color on one side of its shift point substantially matching the color of the paper.

The paper was then treated chemically to drive the indicator dye to the other side of its shift point where it exhibited a second predetermined color so that the message appeared on the paper in a contrasting color.

EXAMPLE 3

Fingerprint information was printed on a sheet of paper which had been previously dyed with a pH-sensitive dye having a predetermined color on the acid side of its shift point. The fingers of a suspect to be fingerprinted were then moistened with a basic solution comprising sodium carbonate dissolved in water.

The moistened fingers were then pressed against the pH-sensitive paper driving the portion of the paper underlying the fingers to the basic side of its shift point whereupon the underlying portion changed color leaving the suspect's fingerprints.

EXAMPLE 4

Fingerprints were taken in accordance with the preceding example except that sodium carbonate was mixed with a transparent jell which was substituted for the sodium carbonate solution.

EXAMPLE 5

A dart game was played by printing a target on a sheet of pH-sensitive paper.

Darts having an absorbent tip which was saturated with a chemical solution capable of driving the paper to the other side of its shift point were directed toward the target.

Darts striking the target drove the pH-sensitive dye to the other side of its shift point, thereby changing the color of the paper underlying the spot struck by the dart.

EXAMPLE 6

Sodium carbonate was mixed with a transparent thickening agent comprising an aqueous solution of sodium polyacrylate making a viscous solution.

The thickening agent was then applied to a pH-sensitive paper which had been dyed to a yellow color by employing direct yellow 4 and setting the paper on the acid side of its shift point. The area of the paper which was covered by the thickening agent turned to a vivid red color displaying the design traced thereon.

EXAMPLE 7

A thickening agent was applied to a paper in accordance with the preceding example and then the design was removed from the paper by treating it with an acid solution prepared by saturating a sponge with a citric acid and then rubbing the sponge over the paper.

EXAMPLE 8

A simulated blackboard was prepared by treating a wooden slab with a pH-sensitive dye which was set on one side of its shift point.

Messages were then written on the blackboard by using a felt tip which was saturated with a solution capable of driving the indicator dye to the other side of its shift point.

The message was then erased by saturating a sponge with a chemical which would drive the indicator dye back to the first side of its shift point and rubbing the board with the sponge.

EXAMPLE 9

A simulated blackboard was prepared in accordance with the preceding example using direct yellow 4 as the indicator dye. The felt tip was then saturated with a sodium carbonate solution by placing a strip of sodium-carbonate-containing, absorbent paper in a wick-type pen and filling the pen with water and then positioning the felt tip at the end of the pen in communication with the solution.

EXAMPLE 10

The steps of Example 1 were followed using a yellow crayon to write on paper which had been dyed with direct yellow 4 set on the acid side of its shift range to give it a yellow color. The paper exhibited a vidid red color on the basic side of its shift range.

EXAMPLE 11

The steps of Example 1 may be followed using alizarin yellow R indicator dye to make the pH-sensitive paper which will exhibit a grape color on the basic side of the shift range and a pale yellow color on the acid side. A pale yellow crayon may then be used by first setting the paper on its acid side.

EXAMPLE 12

The steps of Example 1 may be followed using a Congo red indicator dye to make the pH-sensitive paper which will exhibit a black color on the acid side of its shift range and a deep red color on the basic side. A black crayon may than be used by first setting the paper on its acid side.

It will be clearly understood that the above examples are by way of illustration both as to the indicator dyes utilized and the suggested mode of use. Many commercially available indicator dyes reasonably would fall within the application of the present invention and may be employed on an empirical test basis to obtain the coloring desired. Some other examples of indicator dyes that may be utilized are the following:

Methyl violet, crystal violet, ethyl violet, malachite green oxalate, methyl green, cresol red, quinaldine red, para methyl red, metanil yellow, thymol blue, meta cresol purple, erythrosin disodium salt, benzopurpurin 4B, dinitrophenol, methyl orange-xylene-cyanole solution, methyl orange, ethyl orange, methoxybenzenesulfonic acid, bromcresol green, resazurin, ethyl red, lacmoid, methyl red, propyl red, bromcresol purple, chlorphenol red, nitrophenol, bromthymol blue, brilliant yellow, phenol red, neutral red, nitrophenol, curcumin, meta cresol purple, cresolphthalein, naphthobenzein, phenolphthalein, thymolphthalein, alizarin red, to mention only illustrative examples.

In the specific applications of the disclosed invention as toys, namely, as applied to paper and the like for games, a parameter of safety must be kept clearly in mind. The utilitarian play value of the toys requires that the child sequentially utilizes safe basic and acid solutions to achieve the desired color changes. The game may be vended as a unit together with acid and basic chemicals which are stored in blotting paper or sponges in dry form. When the chemicals are moistened, they will coact with the particular dyes to achieve the desired color changes. Thus, the child merely dips the blotting paper or the sponges in water. Solution concentrations which result when the sponges are dipped in water will be nontoxic if accidentally swallowed. Readily available household items may be employed in the preparation of the acid and basic sponges required to induce color changes on the paper supplied with the game. In this connection, it will be recalled that the terms acid and basic solution have relative meaning only with respect to the pH shift range of the particular indicator dye employed. They are not of necessity within the acid scale range or basic scale range with respect to neutral point pH 7, though they very well may be and still achieve the desired result.

By employing indicator dyes in the practice of the disclosed invention whose shift point or range falls relatively close to the neutral point 7, as for example within the range 3 to 11, it has been found that conventionally available household items such as critic juices, vinegar or the like function satisfactorily to return the paper to the acid side of its shift range. Also, readily available household items such as sodium carbonate, namely, common washing soda, or sodium bicarbonate, frequently used as an antiacid for human consumption, are satisfactory to accomplish the pH shift required for color change of the paper in the basic direction. The solutions necessary to achieve the desired results may be of relatively weak concentration within the range of ½ percent to 5 percent by weight. The functional ability of the invention to employ vinegar, citric juices, sodium carbonate, or sodium bicarbonate and in the mild concentrations suggested clearly meets the safety parameter. The availability, nontoxic characteristics, and essentially edible nature of such products permits use by children and adults without producing undesirable physical harm. In addition, all writing materials used in the game are innocuous in that they do not result in the smudging or smearing of walls or the like because colorless materials such as water and the previously mentioned thickening agent are employed.

From the above, it will be apparent that the invention as particularly applied to the toy art presents a novel and unique creation having great utilitarian and play function. In addition, the invention is consistent with safety requirements and offers stability in the environments where used consistent with a long life because of the reversible nature of the pH-sensitive paper employed.

The invention is disclosed by way of illustration and may be subject to various modifications without departing from the scope of the appended claims.

What is. claimed is:
1. A game comprising:
   a first writing medium defining a surface substantially the entire area of which is colored the same color by a pH sensitive indicator dye having a first predetermined color on one side its shift range and of a second predetermined color on the other side of its shift range;
   a second writing medium in the form of a movable member coating with said first medium for delineating information on a selected portion of said surface; and means for applying to one of said selected portion of said surface or the remaining portion of said surface, a solution having a pH on the said other side of its shift range whereby said information will appear in a different color from the remaining portion of said surface.

2. A game as defined in claim 1 wherein said movable member comprises a writing instrument for depositing on said surface a material, not pH sensitive, of said first predetermined color serving to invisibly shield covered portions of said surface from said solution; said means comprising means for applying said solution to the remaining portion of said surface to change the same to said second predetermined color.

3. A game as defined in claim 2 wherein said movable member comprises a wax crayon.

References Cited

UNITED STATES PATENTS

| | | | |
|---|---|---|---|
| 1,884,197 | 10/1932 | Peterson et al. | 283—6 X |
| 2,618,866 | 11/1952 | Adams | 35—9 |
| 3,190,654 | 6/1965 | Ross. | |

FOREIGN PATENTS

| | | |
|---|---|---|
| 351,053 | 4/1905 | France. |
| 6,848 | 1/1907 | France. |
| | | (2nd addition to 351,053) |

LAWRENCE CHARLES, *Primary Examiner.*

U.S. Cl. X.R.

273—102.1; 401—198